(12) United States Patent
Misof

(10) Patent No.: US 7,597,462 B2
(45) Date of Patent: Oct. 6, 2009

(54) SHELVING ILLUMINATION ELEMENT

(75) Inventor: Timm Misof, Frankfurt (DE)

(73) Assignee: Gesa Form + Funktion Displaybau GmbH, Dreieich-Offenthal (DE)

(*) Notice: Subject to any disclaimer, the term of this patent is extended or adjusted under 35 U.S.C. 154(b) by 100 days.

(21) Appl. No.: 11/691,483

(22) Filed: Mar. 26, 2007

(65) Prior Publication Data
US 2007/0230212 A1 Oct. 4, 2007

(30) Foreign Application Priority Data
Mar. 28, 2006 (DE) .................. 20 2006 004 865 U

(51) Int. Cl.
*F21V 17/14* (2006.01)
(52) U.S. Cl. .................. 362/368; 362/33; 362/362; 362/602; 362/604; 362/632
(58) Field of Classification Search .................. 362/33, 362/362, 368, 602, 604, 632
See application file for complete search history.

(56) References Cited

U.S. PATENT DOCUMENTS

| 5,359,503 | A | | 10/1994 | Myodo et al. | |
|---|---|---|---|---|---|
| 5,530,628 | A | * | 6/1996 | Ngai | 362/33 |
| 5,984,486 | A | * | 11/1999 | Munz et al. | 362/33 |
| 6,386,723 | B1 | * | 5/2002 | Eberlein et al. | 362/33 |
| 2005/0185395 | A1 | * | 8/2005 | Pinter | 362/201 |

FOREIGN PATENT DOCUMENTS

| DE | 85 33 551 U1 | 2/1986 |
|---|---|---|
| DE | 40 31 773 A1 | 4/1991 |
| DE | 42 20 727 A1 | 4/1993 |

* cited by examiner

*Primary Examiner*—Sandra L O'Shea
*Assistant Examiner*—Meghan K Dunwiddie
(74) *Attorney, Agent, or Firm*—Nixon Peabody LLP

(57) ABSTRACT

Product cabinet having an illumination element, wherein the illumination element is fastened to the product cabinet and further comprises:
  a light-conducting luminous body which has a planar front side from which light emerges and which has a side surface into which light is fed, wherein the luminous body is configured so that the light entering laterally is deflected within the luminous body to the front side, so that it emerges there; and at least one light source, which emits light onto the side surface.

4 Claims, 4 Drawing Sheets

SHELVING ILLUMINATION ELEMENT

ILLUMINATION ELEMENT

The invention relates to an illumination element comprising at least one light source, a light-conducting luminous body of planar design and a housing, wherein the light source is installed in a light emitting zone which is adjoined on at least one side by a light-conducting luminous body which accepts the light laterally and emits it forwardly.

FIELD OF THE INVENTION

Illumination elements of many designs are known. The German laid-open document DE 42 20 727 A1 discloses a surface-luminous illumination unit which is designed as a compact unit and emits a glare-free light, in order to illuminate effectively the objects to be illuminated. The surface-luminous illumination unit therein described is constructed from light-transmitting luminous panels which are disposed in layers above one another such that the sides of the luminous panels into which the light enters lie on a level with one another, whereas the other sides from which the light emerges are disposed step-wise; with this design, the luminous panels have different lengths.

The German laid-open document DE 40 31 773 A1, on the other hand, discloses a presentation or sales cabinet with an information device, wherein the information device has a surface for accommodating lettering, depictions, coloured fields or the like, as well as fastening means for attachment to the cabinet. DE 40 31 773 A1 is therefore able to make available an indicator device for lettering, depictions, coloured fields or the like, these being easily exchanged and mounted, as well as being readily recognisable.

The German utility model G 85 33 551 U1 discloses a cabinet with shelves disposed over one another, said shelves preferably serving for placement of cosmetic articles, wherein the individual shelves are configured mutually spaced by means of shelf brackets and the shelves, which are designed as independent shelf supports, are provided on their upper and lower surfaces with receptacles such that a flange situated thereabove is carried by a flange situated thereunder.

None of these inventions, however, describes an illumination element with an illuminated transparent visible surface which is suitable for accommodating lettering, depictions, coloured fields or the like.

SUMMARY OF THE INVENTION

It is the object of the present invention to provide a cabinet with a homogeneous light surface.

The object of the present invention is achieved with the cabinet described in the independent claims and its luminous body.

By means of the disposal of the light source and the luminous means in a region which does not permit a direct view of the luminous means from outside, the even emergence of light is achieved without the necessity for a deep construction.

The product cabinet is connected to an illumination element, wherein the illumination element is fastened to the product cabinet with a holding profile.

For homogeneous distribution of the light without a deep construction, a luminous body is used which conducts light and which has a planar front side from which the light emerges and which has a side surface into which the light is fed. The plastics profile has, for example, reflective particles which evenly deflect the laterally entering light to the front side, wherein the luminous body emits the light uniformly. It is thereby achieved that the laterally entering light is deflected within the luminous body to the front side, so that it emerges there. The light source can therefore be disposed in a region covered by profiles without a direct line of sight from a person standing in front of the cabinet to the luminous means.

The advantages achieved with the invention consist therein that a surface-luminous illumination unit is provided which permits the products in the respective cabinet to be labelled and/or indicated in a manner that advertises them effectively in a highly compact construction. In addition, the surface-luminous illumination unit can be used as a decorative structural element.

Due to the illumination effect, it is possible to place product information or promotional advertising of the respective products visibly near the relevant products. A further advantage of the surface-luminous illumination unit is that the greatest possible level of legibility of the transparent light surface is ensured, even in poor lighting conditions.

Advantageous embodiments of the invention are disclosed in the claims. In a further development, the illumination element can have a transparent visible surface which is configured to accommodate lettering, depictions and coloured fields. A further preferred embodiment provides, furthermore, that the transparent visible surface is made from a transparent polymer, preferably polymethylmethacrylate (PMMA) or polycarbonate. The illumination element can also have a plurality of light emitting zones which are preferably disposed parallel or perpendicular to each other. The light source is a cold cathode tube and/or light-emitting diodes. In a further advantageous embodiment, the housing is provided on the inside with a reflective coating. The light-conducting luminous body thus extends across the entire front region of the illumination element. A further advantageous embodiment consists therein that the luminous body is fixed by fixing elements to a particular position within the illumination element. The luminous body comprises glass or a transparent polymer, preferably polymethylmethacrylate (PMMA) or polycarbonate. The illumination element also has a screw element for fastening to a cabinet shelf.

DETAILED DESCRIPTION

Figure 1:
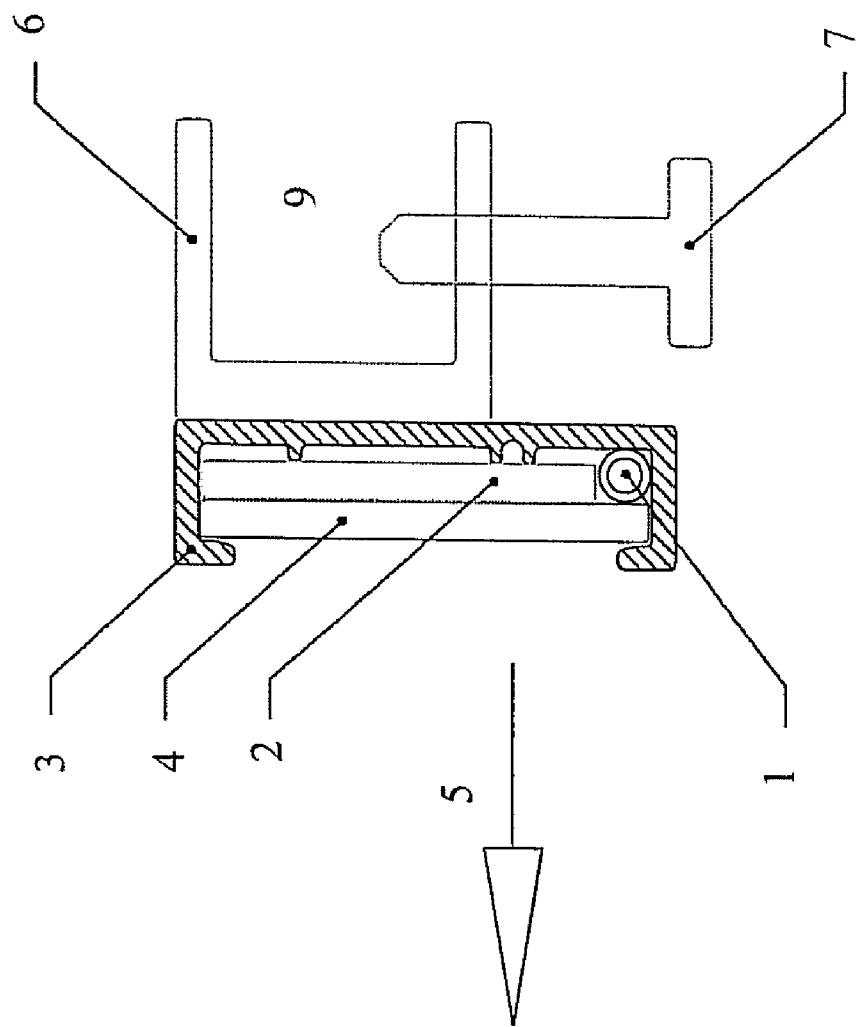
FIG. 1 shows a schematic representation of the illumination element from the side.

FIG. 1 shows the illumination element according to the invention in a schematic representation. The light source 1 is located in a region of the illumination element which does not permit a direct line of sight to an observer standing in front of the light emitting zone 5. The light emitted from the light source passes through the light-conducting luminous body 2 to the transparent visible surface 4. By means of special doping of the luminous body 2, the light which is radiated into the luminous body at the narrow side surface is deflected within the luminous body, so that the light emerges from the front side of the luminous body.

In the preferred embodiment, a transparent visible surface 4 (diffusion screen) which has a scattering effect and makes the emerging light appear more diffuse is disposed in front of the luminous body.

The preferably tubular luminous means 1 is disposed in a recess which is shielded from behind and below by the housing or support profile 3 and is covered from in front at least partially by the wrapping-around of a U-shaped profile. The light-conducting luminous body 2 lies spaced from the support profile on lugs or tongues. It is naturally also conceivable that only a single-layered light-conducting luminous body is used which has a milled-out recess, in which the tubes 11 are disposed.

A holding profile 6 or a cabinet shelf fixing which extends round a cabinet shelf adjoins the support profile. The illumination element is fastened to the cabinet shelf in clamped manner with a fixing element or a fastening screw which is screwed into the U-shaped holding profile 6 from underneath.

Figure 2:
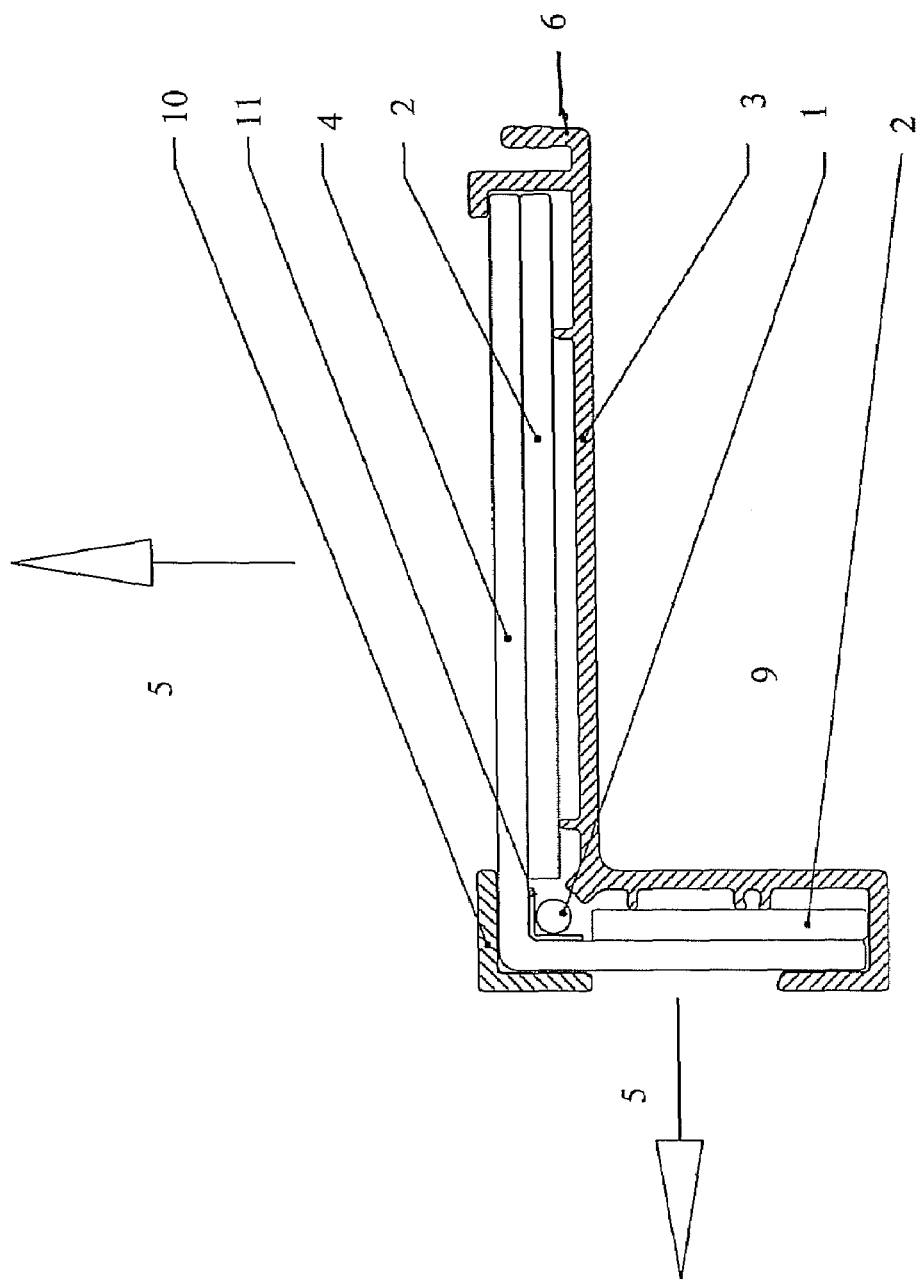
FIG. 2 shows a schematic representation of the illumination element in an L-shaped embodiment.

FIG. 2 shows an alternative embodiment wherein the illumination element is designed L-shaped. The luminous means is located in the intersection of the two limbs of the L. In order that the light does not emerge from the edge, an L-shaped reflector 11 is disposed between the transparent visible surface and the tubular lamp. Furthermore, a cover profile 10 is also disposed from outside in order to produce a visually homogeneous impression.

Figure 3:
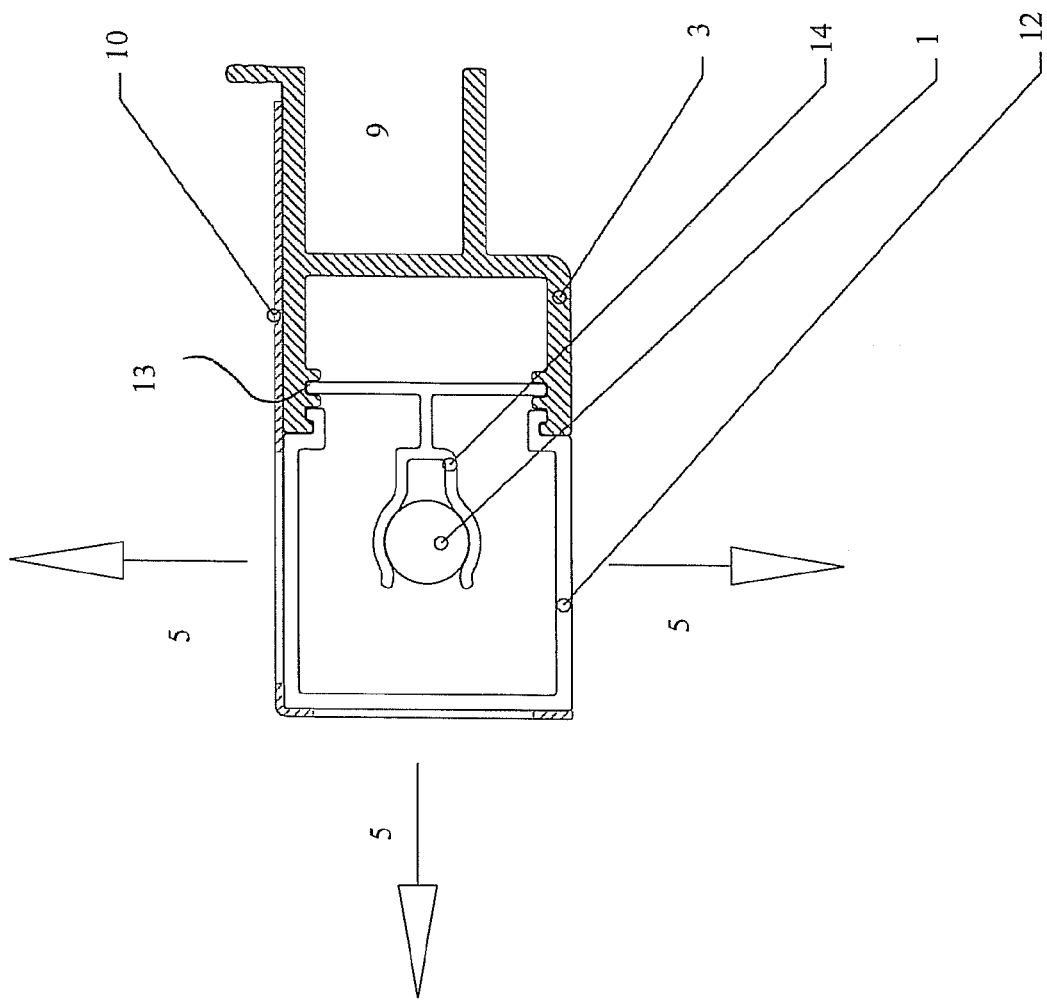
FIG. 3 shows a schematic representation of the illumination element with a central disposal within the luminous means within the plastics profile.

FIG. 3 shows a further embodiment. In order to achieve a homogeneous light output, the fluorescent tube is disposed centrally within the illumination unit. A luminous screen 12, which is also designed as a plastics profile, extends round the centrally disposed tube 1. The luminous screen has a rectangular cross-section, as well as tongues which engage in grooves provided by the support profile 3. A further set of grooves 13 serves to enable a plate to be guided into the support profile on which a U-shaped clamping profile 14 is disposed which holds the illumination unit. This clamping profile enables the fluorescent tubes to be held clamped centrally in the illumination unit. The clamping profile is designed to be transparent or is made of a light-conducting material which distributes the light evenly, so that homogeneous emission within the luminous screen is achieved. The clamping profile preferably extends over the whole length of the illumination unit or luminous means, so that an even light output is achieved. Furthermore, the clamping profile is preferably extruded. A cover profile, which partially covers the edges of the luminous screen, is additionally disposed round the luminous screen, so that the light can emerge only at the lateral surfaces. This further increases the homogeneity.

Figure 4:
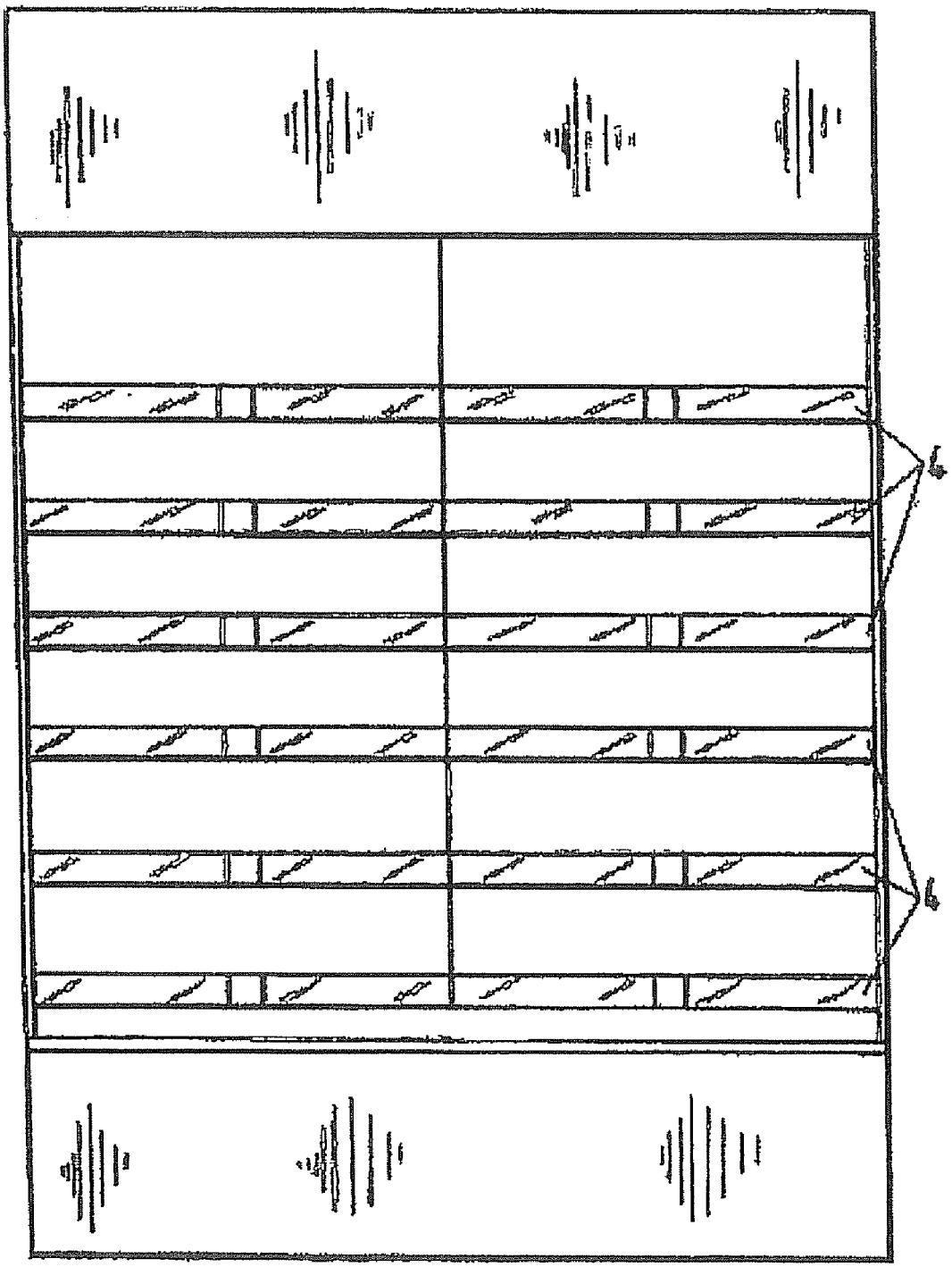
FIG. 4 shows a front view of a cabinet element with illumination elements according to the invention.

FIG. 4 shows a plain view of a cabinet element with the illumination element 9, 4 according to the invention, wherein the illumination element can be connected positively and/or non-positively to the cabinet element.

The preferred embodiments described do not serve to restrict the invention, but rather serve to make the invention more readily understood. The protective scope is defined solely by the claims.

The invention claimed is:

1. Product cabinet having an illumination element, wherein an illumination element is fastened to the product cabinet, and further comprises:
   a support profile for fastening the illumination element to the product cabinet,
   a luminous screen, which is configured as a diffusion screen fastened to the support profile, and which fixes a chamber in which a luminous means is disposed,
   a transparent lamp holder profile which is directly or indirectly fastened to the support profile, which is formed U-shaped in places, so that its limbs hold a tubular luminous means in clamping manner, wherein the lamp holder profile is disposed centrally in the chamber by a web, wherein the web is connected to the holder at the base of the U, said chamber being fixed by the luminescent screen.

2. Product cabinet according to claim 1, wherein the lamp holder profile is made from light-conducting or clear plastics.

3. Product cabinet according to claim 1, wherein the web is disposed vertically on a plate and wherein the outer edges of the plate are guided in grooves of the support profile, wherein the grooves are formed on interior sides of U-shaped limbs of the support profile.

4. Product cabinet according to claim 1, wherein a cover profile extends round the luminous screen, preventing light from passing through at the edges of the luminous screen.

* * * * *